(12) United States Patent (10) Patent No.: US 8,947,714 B2
Ishihara et al. (45) Date of Patent: Feb. 3, 2015

(54) SERVICE PROVIDING DEVICE, PRINTING SYSTEM CONTROL METHOD, AND STORAGE MEDIUM

(71) Applicant: Canon Kabushiki Kaisha, Tokyo (JP)

(72) Inventors: Tomohiro Ishihara, Kawasaki (JP); Masahiro Hadano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/893,948

(22) Filed: May 14, 2013

(65) Prior Publication Data

US 2013/0321861 A1 Dec. 5, 2013

(30) Foreign Application Priority Data

Jun. 4, 2012 (JP) ................... 2012-126853

(51) Int. Cl.
*G06F 3/12* (2006.01)
*H04L 29/08* (2006.01)
(52) U.S. Cl.
CPC ............ *G06F 3/1224* (2013.01); *G06F 3/1293* (2013.01); *H04L 67/16* (2013.01)
USPC .......................................... 358/1.15; 358/2.1
(58) Field of Classification Search
USPC ............. 358/1.15, 1.16, 1.19, 1.18, 434, 435, 358/436, 437, 2.1
See application file for complete search history.

(56) References Cited

U.S. PATENT DOCUMENTS

| | | | |
|---|---|---|---|
| 2003/0063305 A1* | 4/2003 | McIntyre ..................... | 358/1.13 |
| 2008/0079975 A1* | 4/2008 | Ferlitsch et al. ............. | 358/1.13 |
| 2010/0315676 A1* | 12/2010 | Nago ............................ | 358/1.15 |
| 2011/0157627 A1* | 6/2011 | Ishimoto ..................... | 358/1.15 |
| 2011/0238800 A1* | 9/2011 | Ishimoto ..................... | 709/221 |
| 2012/0120436 A1* | 5/2012 | Damera-Venkata et al. | 358/1.13 |
| 2013/0286425 A1* | 10/2013 | Nakamura et al. ........... | 358/1.13 |

OTHER PUBLICATIONS https://developers.google.com/cloud-print/docs/proxyinterfaces?hl=ja; Google Developers; pp. 1-7; last updated Jun. 19, 2012; printed from internet May 14, 2013.

* cited by examiner

*Primary Examiner* — Jerome Grant, II
(74) *Attorney, Agent, or Firm* — Fitzpatrick, Cella, Harper & Scinto

(57) ABSTRACT

The service providing device transmits a registration screen to the information processing device upon receipt of a registration request of an image forming device from the information processing device, transmits a command for causing the information processing device to search the image forming device and to respond to the service providing device with a search result upon receipt of an instruction from the information processing device via a registration instruction unit displayed on a registration screen, registers the image forming device depending on information included in the search result responded according to the command, and initiates communication with the registered image forming device.

5 Claims, 17 Drawing Sheets

FIG. 6A

```
Cloud Print
  ・Printer A
  ・Printer B
  ・Printer C
        :
  Registration completed.
```

FIG. 6B

```
Cloud Print
  ・Printer A
  ・Printer C
        :
  Registration completed.

・Printer B
  Registration failed.
```

FIG. 8A

| Printer Name | PID | Printer IP | Capability |
|---|---|---|---|
| Printer A | P-001 | 1.2.3.4 | p-capa001 |
| Printer B | P-002 | 5.6.7.8 | p-capa002 |
| Printer C | P-003 | 9.10.11.12 | p-capa003 |

| User Account | Password |
|---|---|
| user 1 | abcdefg |
| user 2 | hijklmn |
| user 3 | opqrstu |

```
<Response>
  <PrinterName>
     <Item>Printer A</Item>
  </PrinterName>
  <PID>
     <Item>P-001</Item>
  </PID>
  <PrinterIP>
     <Item>1.2.3.4</Item>
  </PrinterIP>
  <Capabilities>
    :
   </Capavilities>
    :
</Response>
```

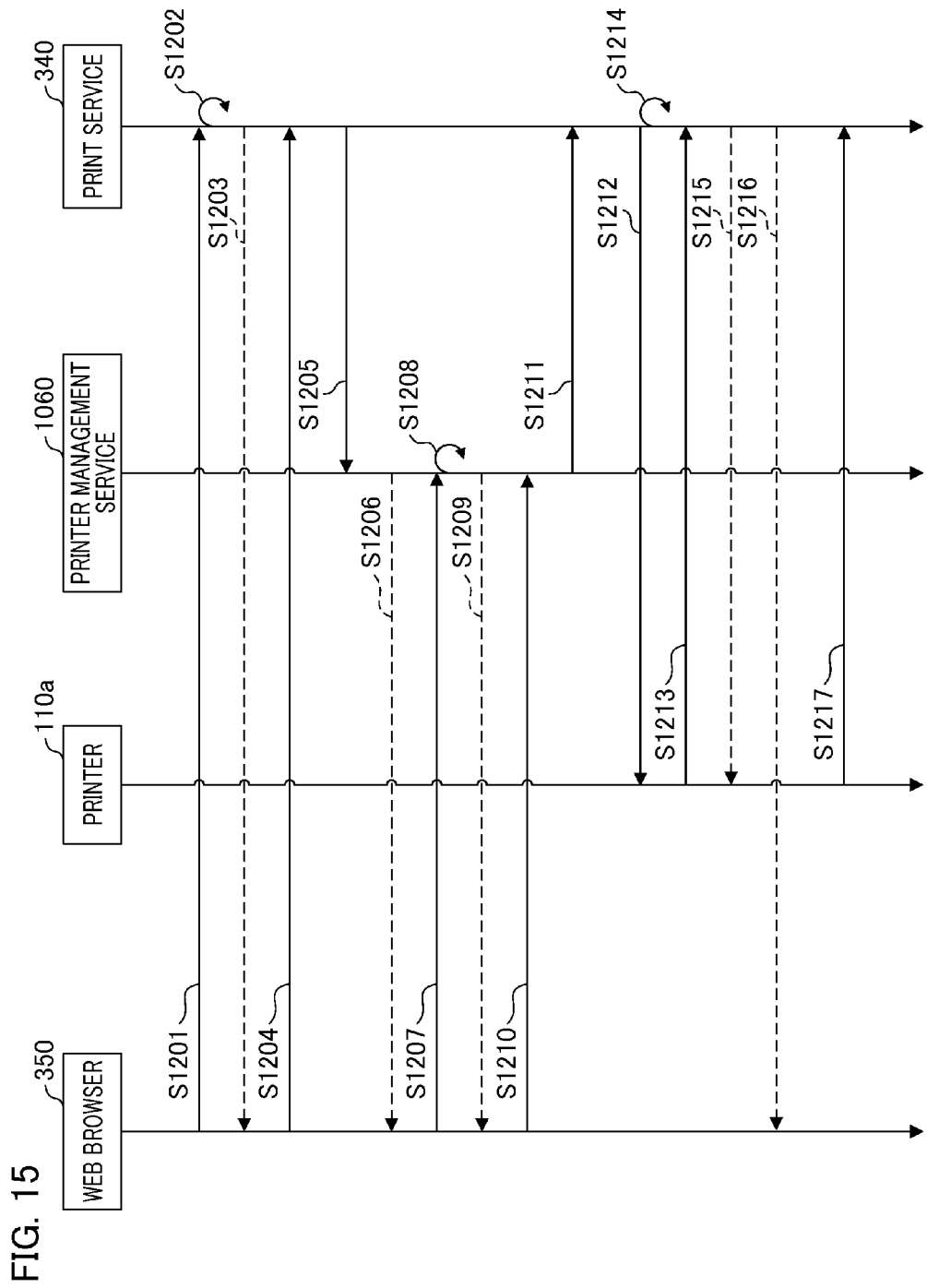

FIG. 16A

Other Service

1301 — Printer List

| | Printer A | ☑ |
| | Printer B | ☑ |
| | Printer C | ☐ |

REGISTER PRINTER IN ANOTHER PRINT SERVICE — 1302

FIG. 16B

Cloud Print

User ID  [         ]
Password [         ]

LOGIN

FIG. 16C

Cloud Print

・Printer A
・Printer B
・Printer C
  :
Register?

OK — 1303

SERVICE PROVIDING DEVICE, PRINTING SYSTEM CONTROL METHOD, AND STORAGE MEDIUM

BACKGROUND OF THE INVENTION

1. Field of the Invention

The present invention relates to a service providing device, a printing system control method, and a storage medium.

2. Description of the Related Art

There is a print system in which a print instruction is transmitted from a client to a server, and the server that receives the print instruction converts the content for printing to print data. A configuration has been conventionally proposed wherein a Web server provides a client with a Web service. In recent years, cloud computing has also attracted attention as a configuration for providing a service from a web server to a client. A main feature of cloud computing is that data conversion and data processing are executed in a distributed manner using many computing resources so as to process requests from many clients in a simultaneous manner. At present, vendors provide various types of services in a disorganized manner by implementing web services in a cloud computing environment to realize cloud computing.

For example, Google® has developed a mechanism for data communication designed to provide services in conjunction with image forming apparatuses, and has publicly disclosed interfaces designed for image forming apparatuses to conduct data communication in a cloud computing environment prepared by Google®. By installing this interface in image forming apparatuses, it is possible for a client to designate an image forming apparatus to conduct printing, even if the image forming apparatus and the server are connected via the Internet. This is called a cloud print system.

For utilizing the aforementioned Webserver (hereinafter referred to as a "service providing device", a user who is a client needs to acquire an account of the service providing device, and to register a printer. Firstly, the user causes an image forming device to connect to and communicate with a service providing device via a network. The user who registers the image forming device directly operates an operation unit of the image forming device or remotely operates the operation unit by using a user device and a network so as to initiate printer registration processing. Alternatively, the user can use an application for registration that has been prepared by respective venders.

Assume an environment where, for example, a user registers an image forming device, via a network, from a user device in the service providing device by using a registration screen that is provided by the service providing device. The user who logged into the service providing device receives an operation screen from the service providing device. For example, icons for accessing a registration screen that provide a printer registration method that varies according to the vender are displayed on this operation screen, and a user can access a printer registration screen of a desired vender. A printer registration screen acquired at this point is a screen that is provided by the vender. By accessing, a user device receives the printer registration screen that is provided by the vender. This enables the user to confirm a printer registration method and to execute printer registration. At this time, the user can use an application for registration in order to perform printer registration that is prepared by the vender.

However, when current printer registration method is employed, a user has to access a printer registration screen that is provided by each vender, and to confirm a printer registration method that varies according to the vender. When a user uses an application for registration, such an application also varies according to the vender and the additional installation of the application imposes a lot of labor to a user. In other words, a user can get a printer registration method on an operation screen provided by the service providing device, but cannot collectively register image forming devices that vary according to the vender by means of a series of a registration operation on this operation screen. That is, the operation screen provided by the service providing device does not function as a printer registration screen for registering one or more image forming devices of which a registration method varies according the vender in the service providing device by means of a series of registration operations independent of the vender.

SUMMARY OF THE INVENTION

The service providing device according to the present invention provides a user device with a printer registration screen that enables a simplified registration of one or more image forming devices of which a registration method varies according a vender by performing a series of registration operations that does not depend on the vender.

The service providing device of an aspect of the present invention communicates with an image forming device that executes printing via a network, and provides a Web service to an information processing device. The service providing device comprising a transmission unit configured to transmit a registration screen to the information processing device upon receipt of a registration request of the image forming device from the information processing device; a command unit configured to transmit a command for causing the information processing device to search for the image forming device and respond to the service providing device with a search result upon receipt of an instruction from the information processing device via a registration instruction unit displayed on the registration screen; and a communication unit configured to register the image forming device in accordance with information included in the search result in response to the command, and to initiate communication with the registered image forming device.

Further features of the present invention will become apparent from the following description of exemplary embodiments with reference to the attached drawings.

BRIEF DESCRIPTION OF THE DRAWINGS

FIGS. 6A and 6B are screen examples displayed on a UI of a user device.

FIGS. 8A and 8B illustrate a management table of an image forming device and a user stored by the print service.

FIG. 9 illustrates information which an image forming device returns to a user device with respect to a search of image forming devices.

FIG. 15 illustrates processing for registering an image forming device in print service in the third embodiment.

FIGS. 16A to 16C are exemplary screens displayed on a UI of a user device.

DESCRIPTION OF THE EMBODIMENTS

First Embodiment

Figure 1:
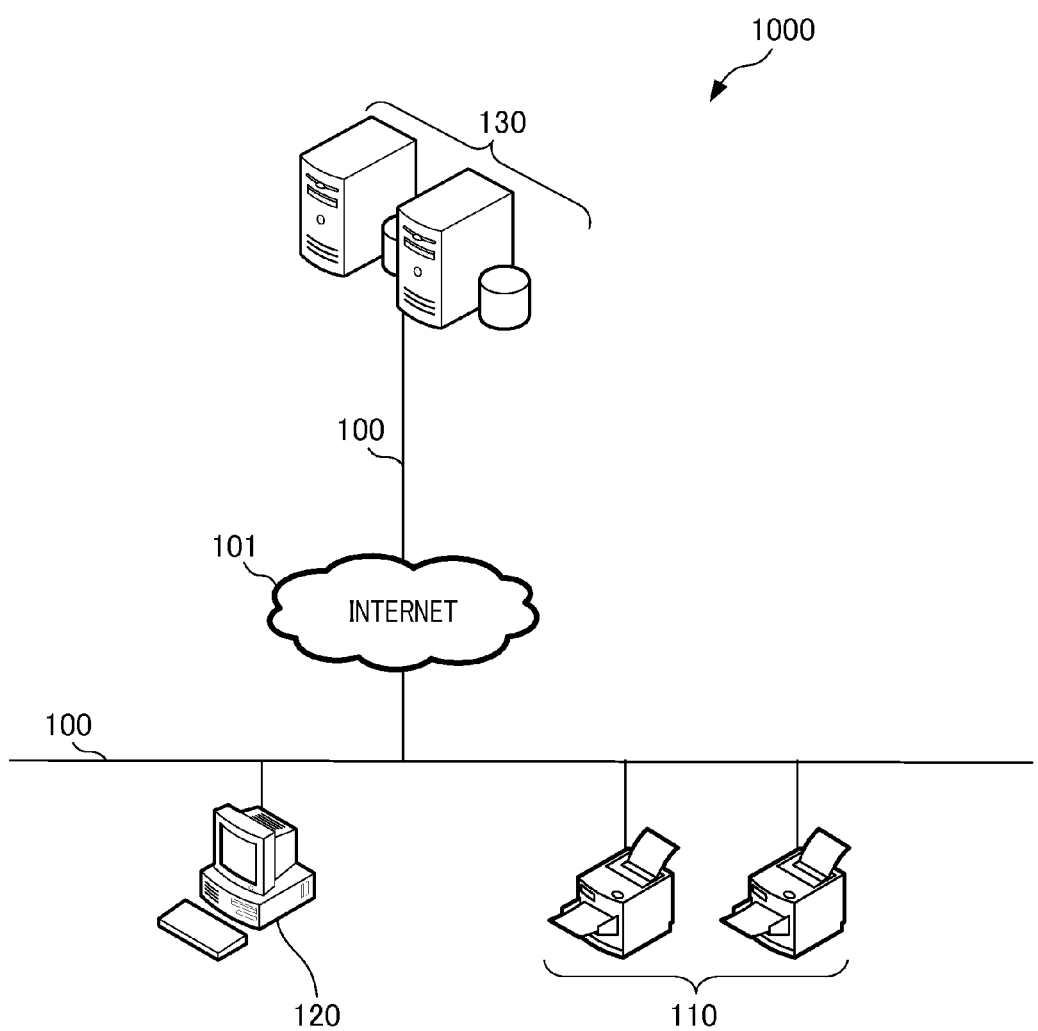
FIG. 1 is a diagram illustrating an example of a printing system configuration according to a first embodiment.

FIG. 1 is a diagram illustrating an example of a print system configuration 1000. The printing system 1000 includes a client 120, one or more image forming devices group 110. The client 120 and the image forming device group 110 are located in a user environment and connected with each other via a network 100. The network 100 is connected to an Internet 101. The client 120 and the image forming device group 110 may be connected via the Internet 101. The printing system 1000 also includes a print server group 130. Each device and server constituting the printing system 1000 can communicate with each other and perform a data communication via the Internet 101. Note that the image forming device group 110 and the print server group 130 are configured with multiple units, but one unit is also acceptable. Also, a user who utilizes the printing system 1000 is not limited to one user, but the client 120 may be offered for various users.

Figure 2:
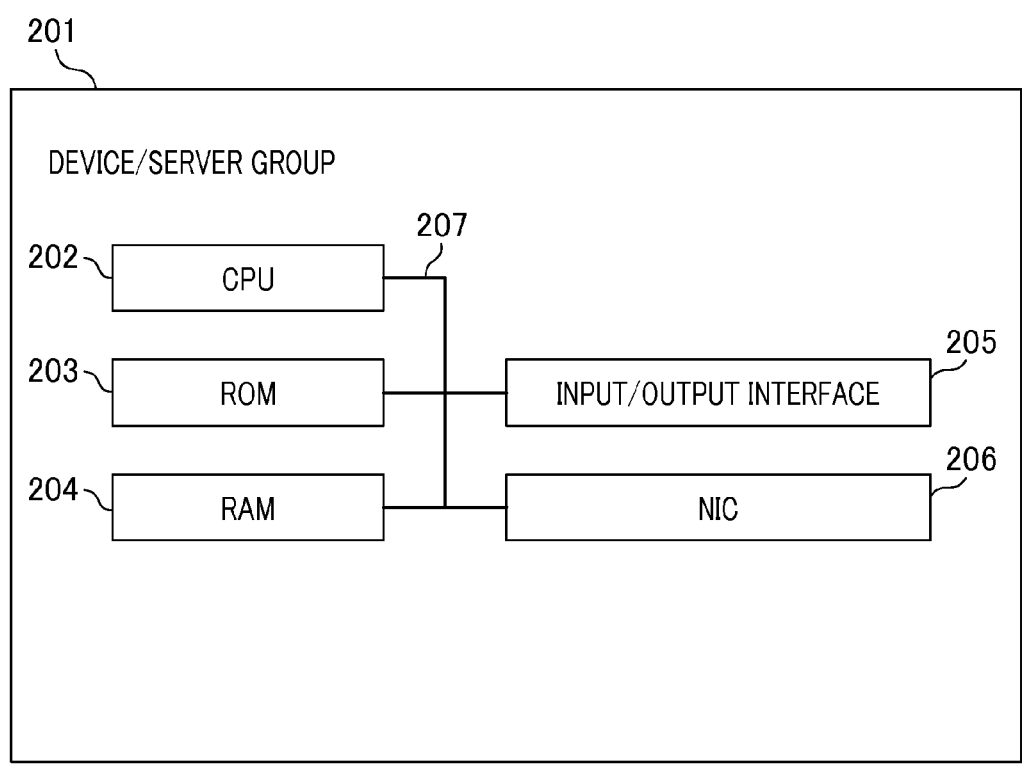
FIG. 2 is a diagram illustrating an example of a hardware configuration of each device and server group configuring the print system.

FIG. 2 is a diagram illustrating a hardware configuration of each device and server constituting the printing system 1000. Reference numeral 201 denotes each device and server constituting the printing system 1000. CPU (Central Processing Unit) 202 is a unit that executes various programs so as to realize various functions. ROM (Read Only Memory) 203 is a unit that stores various programs. RAM (Random Access Memory) 204 is a storage unit that functions as a temporal working storage region for the CPU 202. The CPU 202 loads and runs programs stored in the ROM 203 into the RAM 204.

An input/output interface 205 is an interface unit that transmits data to a display (not shown) connected to each device and server, and receives data from a pointing device (not shown). An NIC (Network Interface Card) 206 is a unit for connecting each device and server configuring the print system 1000 to the network 100. The units described above are capable of receiving and transmitting data via a bus 207. In addition, a printing unit (not shown) is installed in each print controlling unit 310 included in the image forming device group 110, and the printing unit is capable of receiving and transmitting data from/to the various units via the bus 207. The printing unit is a unit capable of printing image data such as a raster image on a recording medium such as recording paper.

Figure 3:
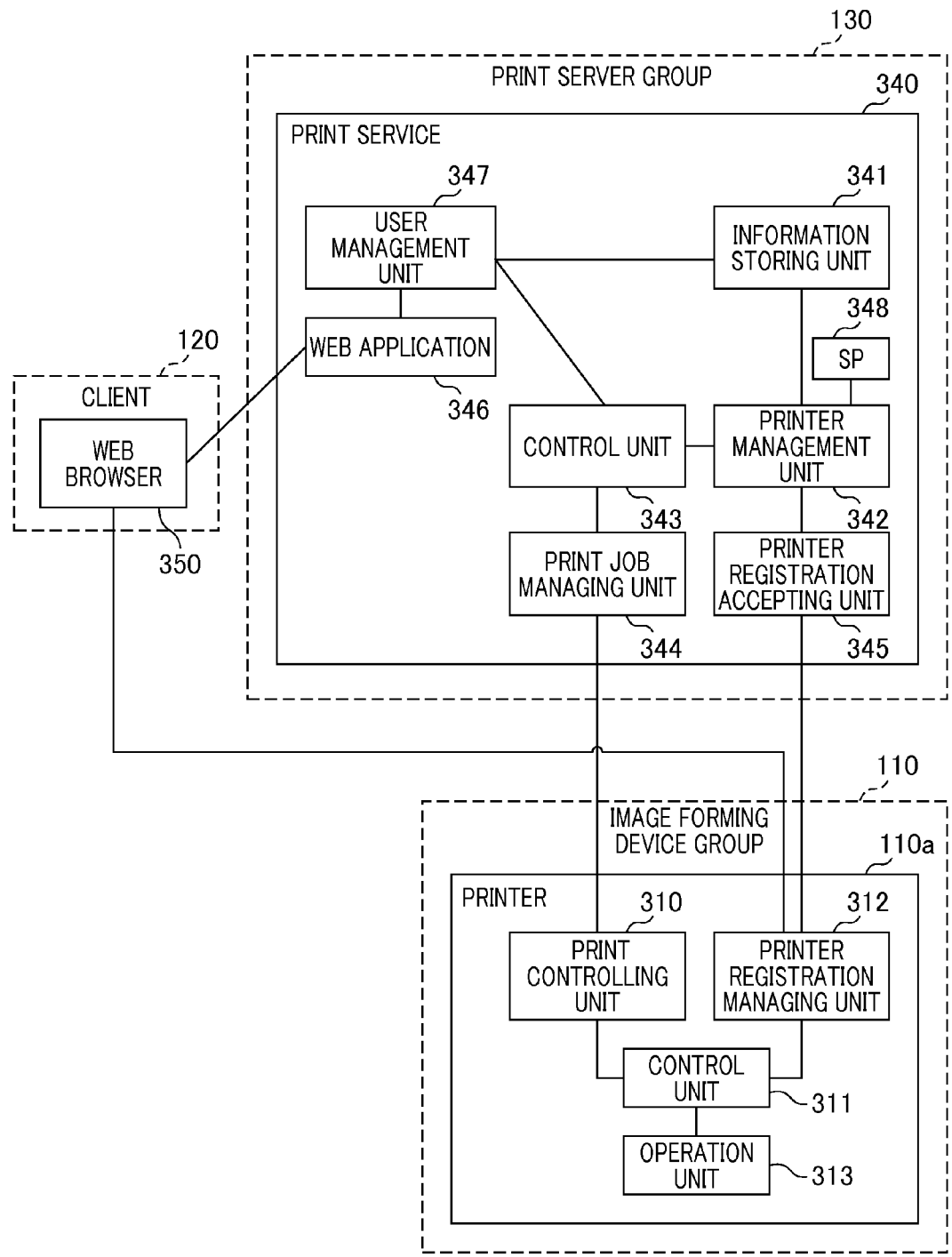
FIG. 3 is a diagram illustrating an example of a software configuration of each device and server group configuring the print system.

FIG. 3 illustrates a software configuration of each device and server configuring the print system 1000. As shown in FIG. 3, the printing system 1000 includes an image forming device 110, a print server 130, and a client 120. Programs for realizing the respective functions of each software configuration illustrated in FIG. 3 are stored in the ROM 203 of each device and each server group, and the CPU 202 loads the programs to the RAM 204 to run them, thereby carrying out these functions.

The print server group 130 is a service providing device that offers a web service to the client 120. A print service described below is included in the web service, and services required for realizing the print service are also included in the web service. Services, for example, for offering a screen on which a user selects a printer for printing are provided by a web service using a conventional technology. The print server group 130 considers a plurality of servers as one server by virtualizing so as to realize functions by means of such a server. In addition, the print server group 130 activates a further plurality of virtual machines in the one server so as to cause the respective virtual machines to realize functions of the print service 340. The print service 340 shown in FIG. 3 indicates the one among the virtual machines. Naturally, one server may realize the print service 340.

The print service 340 includes an information storage unit 341, a printer management unit 342, a control unit 343, a print job managing unit 344, a printer registration accepting unit 345, a Web application 346, a user management unit 347, and a service printer (SP) 348. The control unit 343 controls cooperation between each unit constituting the print service 340. The information storage unit 341 is a database for storage of printer information of a registered image forming device or user account information.

The printer management unit 342 manages printer information of a registered image forming device or an image forming device that has been requested for registration by the client 120. The printer management unit 342 creates a service printer 348 corresponding to the image forming device that has been requested for registration based on the printer information. Note that this service printer 348 is uniquely created for each image forming device that has been requested and for each user account. Thus, even if same image forming device is requested for registration, a different service printer 348 is created for each user when a different user requests for registration.

The service printer 348 is managed in relation to a user account and printer information. When the service printer 348 is created, the print service 340 puts a print job into an image forming device 110 in response to an occurrence of a predetermined print job input event in which the image forming device 110 corresponding to the service printer 348 is designated as a print output destination. In other words, the service printer denotes a printer object corresponding to the image forming device 110 that executes a print job according to a printer instruction by the client 120, and is managed by the print service 340. The printer object is an object having the capabilities and the job queue of the print job included in printer information. However, note that when the service printer is referred in the present invention, only the job queue of the print job may be referred to as the service printer.

The print job managing unit 344 generates a print job in response to a print instruction by the web browser 350 (described below), and transmits the print job to an image forming device designated from among the image forming device group 110. By means of the print job managing unit 344, the printer 110a can obtain a print service from the print server group 130. The print service means a service where the print job generated on the basis of data transmitted to the print server group 130 is passed to the printer 110a, and a printing is executed based on the print job by the printer 110a. The printer registration accepting unit 345 receives a registration request from the printer 110a of the image forming device group 110 in the print service 340, and instructs the printer management unit 342 about a printer management to. The web application 346 receives various requests from the web browser 350, and provides UIs such as a log-in screen for the print service 340 or printer management screen. The user management unit 347 manages account information of a user who utilizes the print service 340.

The client 120 includes a web browser 350, and functions as an information processing device that can communicate with the print server group 130 and the image forming device group 110. The web browser 350 communicates with the web application 346 of the print server group 130, acquires a log-in screen for the print service 340 or a printer management screen, to thereby realize various operations. Also, the web browser 350 communicates with the printer registration managing unit 312 of the image forming device group 110 and transmits a command relating to a printer registration to the image forming device group 110.

The image forming device group 110 includes the printer 110a. Although only printer 110a is illustrated in FIG. 3 and described below, printers that have same configuration such as a printer 110b may be provided when there is a plurality of image forming devices 110. There may be only printer 110a or two or more printers. Hereinafter, description about the printer 110a can be applied to a printer such as the printer 110b.

The printer 110a can communicate with the web browser 350 and the print service 340 via the network. The printer 110a includes a print controlling unit 310, a control unit 311, a printer registration managing unit 312, and an operation unit 313. The control unit 311 controls cooperation between the print controlling unit 310 of the printer 110a, the printer registration managing unit 312, and the operation unit 313. The print controlling unit 310 controls print processing through the print service 340, for example, receives the print job generated by the print job management unit 344 so as to execute printing.

The printer registration managing unit 312 receives, for example, an instruction from a user, and transmits user information and printer information to the printer registration accepting unit 345. The printer registration managing unit 312 controls processing for registering the image forming device in the print service 340. The operation unit 313 is a user interface such as a panel provided in the image forming device. The print controlling unit 310 and the printer registration managing unit 312 are connected to the network 100 so as to communicate with the print job managing unit 344 and the printer registration accepting unit 345 of the print service 340.

User information and printer information transmitted to the print service 340 are stored in the information storage unit 341 of the print service 340. In the present embodiment, printer information includes a printer name, PID (Printer ID), a printer IP address, and capabilities, but is not limited thereto. Also, user information includes a user account and a password, but may refer to the user account. The information storage unit 341 links the aforementioned printer information with user account and stores them when the printer management unit 342 requests a printer registration. FIG. 8A is a diagram illustrating information stored by the information storage unit 341. The printer name corresponds to 601, the PID to 602, the printer IP address to 603, capabilities to 604, the user account to 605, and the password to 606.

The printer name is assigned to the printer 110a, and used when the printer 110a is called. The printer name is different from identification information, the respective printer names may be same. The PID is identification information assigned to the respective image forming devices. A Mac address and the like are available as unique identification information, but are not limited thereto. The print service 340 can specify a location of the printer 110a by specifying the PID. The printer IP address is information indicating an address (addressing) of the image forming device on the network.

Capabilities include information about whether or not the image forming apparatus 110a can perform double-sided printing, whether or not it can perform color printing, paper sizes that can be output, and the like. The user account is user identification information assigned to a user. The password is a character string required when a user logs into the print service 340 with his/her user account, and may be encrypted.

Figure 7:
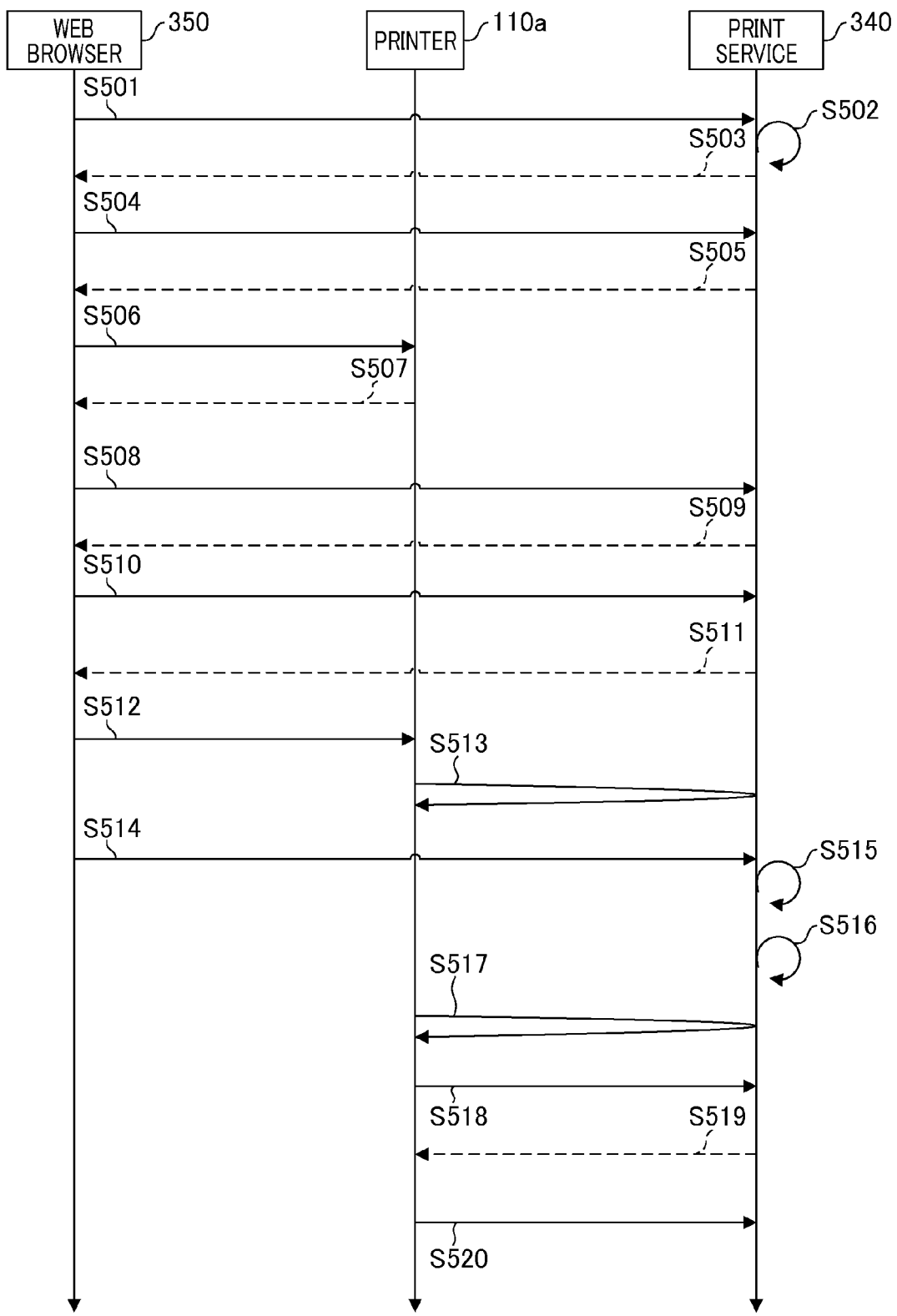
FIG. 7 illustrates processing for registering an image forming device in a print service in a first embodiment.

FIG. 7 is a sequence diagram describing exemplary registering processing of the image forming device group 110 in the print service 340 in the first embodiment. Although one printer 110a is illustrated in FIG. 7, the same processing is performed when there is a plurality of printer such as the printer 110b. In the present embodiment, assume that a user account/password is registered in the print service 340 in advance, the user account/password is issued by the print service 340 and managed by the user management unit 347.

A user must log into the print service 340 in order to register a printer in the print service 340 through the web browser 350. In S501, the user acquires a login screen from the print service 340, inputs a user account/password on the login screen displayed by the web browser 350 to thereby log into the print service 340. Alternatively, information that has been stored by the web browser 350 may be used if login is completed before.

Figure 4A:
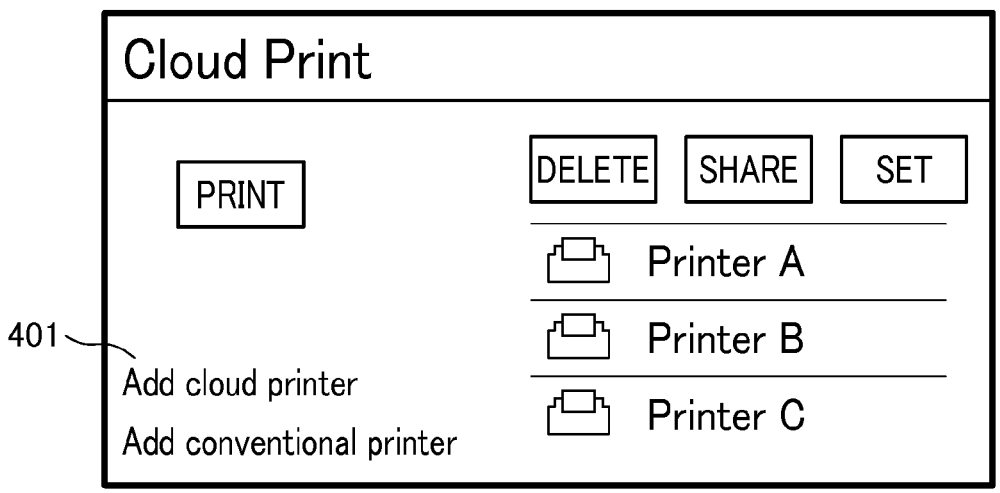
FIGS. 4A and 4B are screen examples displayed on a UI of a user device.

In S502, the web application 346 of the print service 340 authenticates the user account and the password input in S501. When the user has successfully logged in, the web application 346 transmits a printer management screen shown in FIG. 4A to the web browser 350 in S503. In other words, the web application 346 functions as a transmission unit that transmits a registration screen to the web browser 350 upon receipt of a registration request of the image forming device. The web browser 350 then displays the received printer registration screen.

Figure 4B:
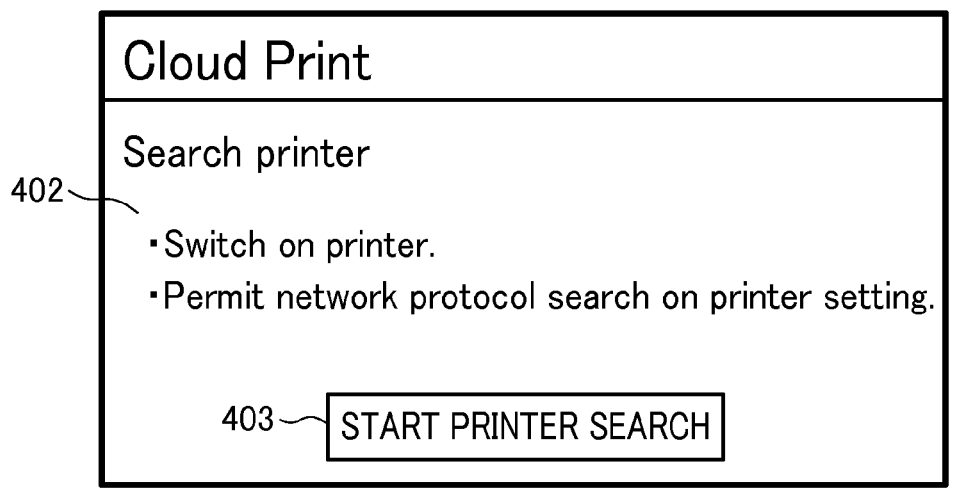

When the user presses a link 401 for adding a cloud-compatible printer (FIG. 4A) and that is a registration instruction unit in S504, the web browser 350 accesses a URL for acquiring a printer search script. Alternatively, the web application 346 may transmit a printer search confirmation screen shown in FIG. 4B due to pressing the list 401 for adding the cloud-compatible printer by the user, and causes the web browser to display it. The printer search confirmation screen (FIG. 4B) has a message 402 for prompting necessary preparation of a protocol search and a printer search start button 403. The web browser 350 accesses the URL for acquiring a printer search script when the user presses the printer search start button 403. Note that the message displayed on the screen in FIG. 4B is not limited thereto. For registering the printer in the print service 340, a condition is required where the printer can send printer information to the print service 340. Hence, any content may be described in the message 402 so long as the printer can send printer information to the print service 340. "Please accept a setting such that the printer to be registered utilizes the print service 340", "please accept a setting of an encrypted communication" and the like are contemplated other than the content described in the message 402.

When the user presses the link 401 for adding the cloud-compatible printer or a printer search execution button 403, the web browser 350 accesses the web application 346. In S505, the web application 346 transmits a printer search script to the web browser 350. The printer search script is for searching image forming devices connected to the same network 100 used by the client 120 by means of a known protocol search technique. Examples of known protocol search technique are a WS-Discovery, a SNMP (Simple Network Management Protocol) and the like.

A description will be given of the WS-Discovery as an example. The WS-Discovery is one of a device search method. The WS-Discovery is defined by OASIS (Organization for the Advancement of Structured Information Standards). In the present embodiment, a XML format is applied, but is not limited thereto.

In S506, the web browser 350 receives PROBE packet data as a printer search script from the web application 346, and transmits the PROBE packet data to the network 100 by multicast. At this time, the transmission range is a range that the user can use. In S507, when a printer 110a included in the image forming device group 110 receives the PROBE packet data, the printer 110a transmits PROBEMATCH packet data to the web browser 350 as a response. The web browser 350 that has received the PROBEMATCH packet data transmits it to the web application 346.

The web application 346 that has received PROBE-MATCH packet data further transmits GetMatchData packet data for acquiring printer information for the image forming device to the web browser 350. Printer information includes a printer name, a PID, an image forming device IP, and the like. In addition, capabilities, information indicating whether or not the printer 110a is a cloud-compatible printer, or the like may be included in GetMatchData packet data. GetMatchData packet data may also be data for requesting icon image data indicating the printer 110a. The web browser 350 transmits GetMatchData packet data to the printer 110a upon receipt of the GetMatchData packet data from the web application 346. The printer 110a returns printer information to the web browser 350 as a response upon receipt of the GetMatchData packet data.

FIG. 9 is an exemplary diagram illustrating printer information that is returned as a response to the web browser 350. As shown in FIG. 9, printer information is described in XML. The web browser 350 acquires printer information such as a printer name, a PID, a printer IP, and capabilities. In other words, the web application 346 functions as a command unit that transmits a command for causing the web browser 350 to search image forming devices and to respond to the web application 346 with the search result. In S508, the web browser 350 transmits a response received from the printer 110a to the web application 346. If the web application receives responses from a plurality of image forming devices, the web browser 350 may execute the following processing. Specifically, the web browser 350 may transmit a response with PROBEMATCH packet data or GetMatchData packet data to the web application 346 at any time, or the web browser 350 collectively transmits responses. A method for transmitting printer information also can be designated by the printer search script transmitted from the print service 340. Note that printer information of a printer that has responded to the printer search script is registered in the print service 340. A user can collectively register a plurality of printers in the print service 340 by means of one registration procedure by using the web browser 350 provided in the client 120. An embodiment is described wherein a user registers printer information by using the web browser 350 provided in the client 120, but the present invention is not limited to this embodiment. For example, an embodiment is applied where printer information is registered from a mobile terminal such as a smart phone or a tablet, or an image forming device having a print function. The present invention merely describes the client 120 as an example.

Figure 5A:
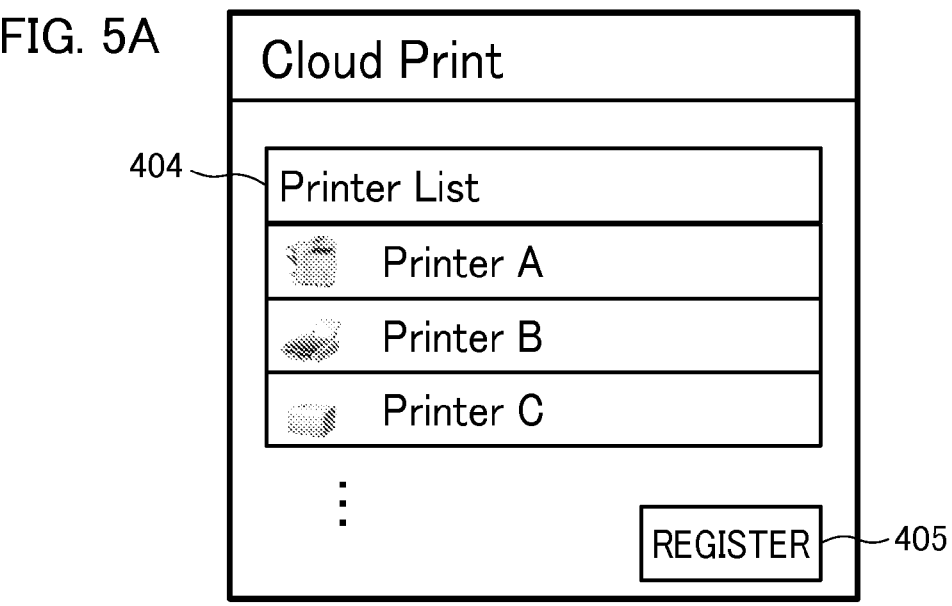
FIGS. 5A to 5C are screen examples displayed on a UI of a user device.

In S509, the web application 346 that received the response generates a printer search result screen having a printer name list 404, and a printer registration execution button 405 as shown in FIG. 5A based on printer information included in the response. Then the web application 346 transmits the generated printer search result screen to the web browser 350. At this time, the web application 346 may transmit icon images corresponding to the respective image forming devices together with the screen when the icon image is included in the response, the web browser 350 may display the icon images. Also, the web browser 350 may display in the printer name list 404 only image forming devices that are a cloud-compatible printer when information indicating whether or not a printer is a cloud-compatible printer is included in the response.

Figure 5B:
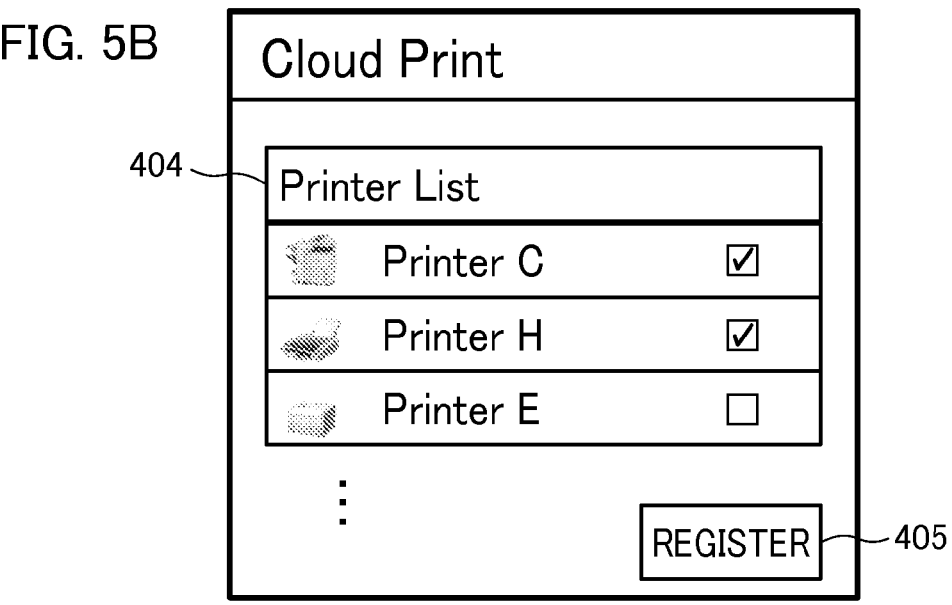
Figure 5C:
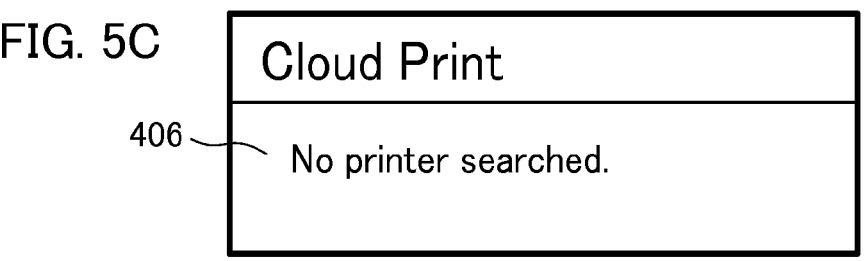

When the response is transmitted to the Web application 346 at any time, the Web application 346 may update the printer name list 404 so as to transmit updated information to the Web browser 350. Alternatively, when the response is collectively transmitted to the Web application 346, the Web browser 350 may display a massage indicating that a device search is being executed until the search is completed. Alternatively, the Web browser 350 may display a check box shown in FIG. 5B as a selectional instruction unit for selecting, by a user, one or more image forming devices to be registered in the printer name list 404. When no image forming device has responded, the Web browser 350 may display a message 406 shown in FIG. 5C indicating that no image forming device has been searched. Also, a printer search failure screen (FIG. 5C) may be displayed when no cloud-compatible printer is included in the image forming devices that have responded and when information indicating whether or not a printer is a cloud-compatible printer is included in a response. When the printer search failure screen (FIG. 5C) is displayed, printer registration processing terminates in this point.

The Web application 346 terminates a search when a predetermined period has elapsed. Alternatively, when the Web browser 350 transmits a response at any time, it may terminate the search when the next response is not received after a given time from which the Web application 346 has finally received the response has elapsed. Even if the search is still ongoing, the search is terminated when a user presses the printer registration executing button 405 (FIGS. 5A and 5B), processing advances to a next step.

When the user presses the printer registration execution button 405, the Web browser 350 instructs the Web application 346 to execute printer registration in S510. In S511, the Web application 346 prepares a printer polling URL and a script for causing the printer 110a to poll the printer polling URL and a user authentication address, and transmits them to the Web browser 350. The printer polling URL and the user authentication address are associated with each other and prepared individually for all image forming devices to be registered. Thus, in addition to the printer polling URL, information such as a printer IP address is included in the script.

The printer polling URL is a URL so that the printer management unit 312 requests and acquires a printer authentication ticket from the printer registration accepting unit 345 of the print service 340. Since authentication processing is required for access from the printer 110a to the print service 340, the printer management unit 312 needs to acquire the printer authentication ticket. The user authentication address is an authentication destination so that the Web browser 350 requests an authentication to the print service 340. When information indicating whether or not an image forming apparatus is a cloud-compatible printer is included in the aforementioned response (FIG. 9), printing cannot be executed by using the print service with respect to the image forming device that is not a cloud-compatible printer, thus the printer authentication ticket is neither prepared nor transmitted.

In S512, the Web browser 350 receives a script for causing the image forming apparatus to poll the printer polling URL. The Web browser 350 distributes the printer polling URL to the printer 110a corresponding to a designated IP address in response to the received script, and instructs it to poll the printer polling URL. In S513, the printer registration managing unit 312 of the printer 110a that has accepted the instruction initiates polling to the printer polling URL.

On the other hand, the Web browser 350 accesses the user authentication address by the user operation in S514. When the Web application 346 accepts the access, the user management unit 347 associates printer information corresponding to the user authentication address with user account information used when the user logged-in, and stores them in the information storage unit 341 in S515. The control unit 343 instructs the printer management unit 342 to generate a service printer upon completion of the storage. Thereafter, the generated service printer communicates with the image forming device having stored printer information. In other words, the printer management unit 342 and the service printer function as a communication unit that registers an image forming device based on information included in the search result provided in response to a command to thereby initiate communication with the registered image forming device.

Further, in S516, the printer registration accepting unit 345 that has been instructed by the control unit 343 allocates a printer authentication ticket by using the printer polling URL which the printer 110a polls as a destination. The printer authentication ticket is authentication information for acquiring access information (that is, an access ticket). In S517, when the printer registration managing unit 312 has acquired the printer authentication ticket by polling, the polling is stopped.

In S518, the printer registration managing unit 312 that has acquired the printer authentication ticket accesses an access ticket acquiring URL by using information in the printer authentication ticket. In S519, the printer registration accepting unit 345 issues an access ticket to the printer registration managing unit 312 when information in the printer authentication ticket is confirmed to be correct.

The printer registration managing unit 312 that has received the access ticket passes it to the print controlling unit 310 via the control unit 311. Thereinafter, the print controlling unit 310 accesses the print job managing unit 344 of the print service 340 in accordance with information in the access ticket, and acquires a print job and the like in S520. In the present embodiment, one printer 110a is represented. However, when there is a plurality of image forming devices, processing in S514 to S520 is repeatedly executed for each device. Therefore, a user needs to access each user authentication address by the number of image forming devices to be registered. The aforementioned is printer registration processing in the present embodiment.

According to printer registration processing of the first embodiment, with a simplified operation, a user can register an imaging device provided by various venders in a service providing device by means of a printer registration screen provided by the service providing device. In other words, printer registration processing can be performed on a UI provided by the print service 340, that is, the printer registration screen, and thus, printer registration processing of a plurality of printers can be initiated at one time. In addition, with a simplified registration operation that does not depend on the vender, a user can register one or more image forming devices that vary by venders in the print service.

Second Embodiment

A method for initiating printer registration processing on the UI provided by the print service 340 is described in the first embodiment. However, in the method in the first embodiment, the Web browser 350 needs to access each user authentication address by the number of image forming devices, and the operation load is increased under an environment where a plurality of image forming devices is registered.

In the first embodiment, the Web browser 350 logs into the print service 340 in S501 shown in FIG. 7. Thus, the print service 340 can acquire user information for using the printer 110a shown in FIG. 8B in advance. If the print service 340 has acquired user information for using the printer 110a in advance, operation in which a user accesses the user authentication address in S514 can be omitted. When processing in S514 is omitted, no more processing performed for each image forming device by the user is needed, and thus, a simplified printer registration method can be provided under the environment where a plurality of image forming devices is registered. In the second embodiment, simpler printer registration method is described in which user authentication processing is improved. A system configuration, a hardware configuration, and a software configuration for realizing the second embodiment is same as those described in the first embodiment, and thus, the descriptions thereof are omitted. Also, the content of the first embodiment is applied to portions not explained in the second embodiment. Hence, modifications in the first embodiment can also be applied in the second embodiment.

Figure 10:
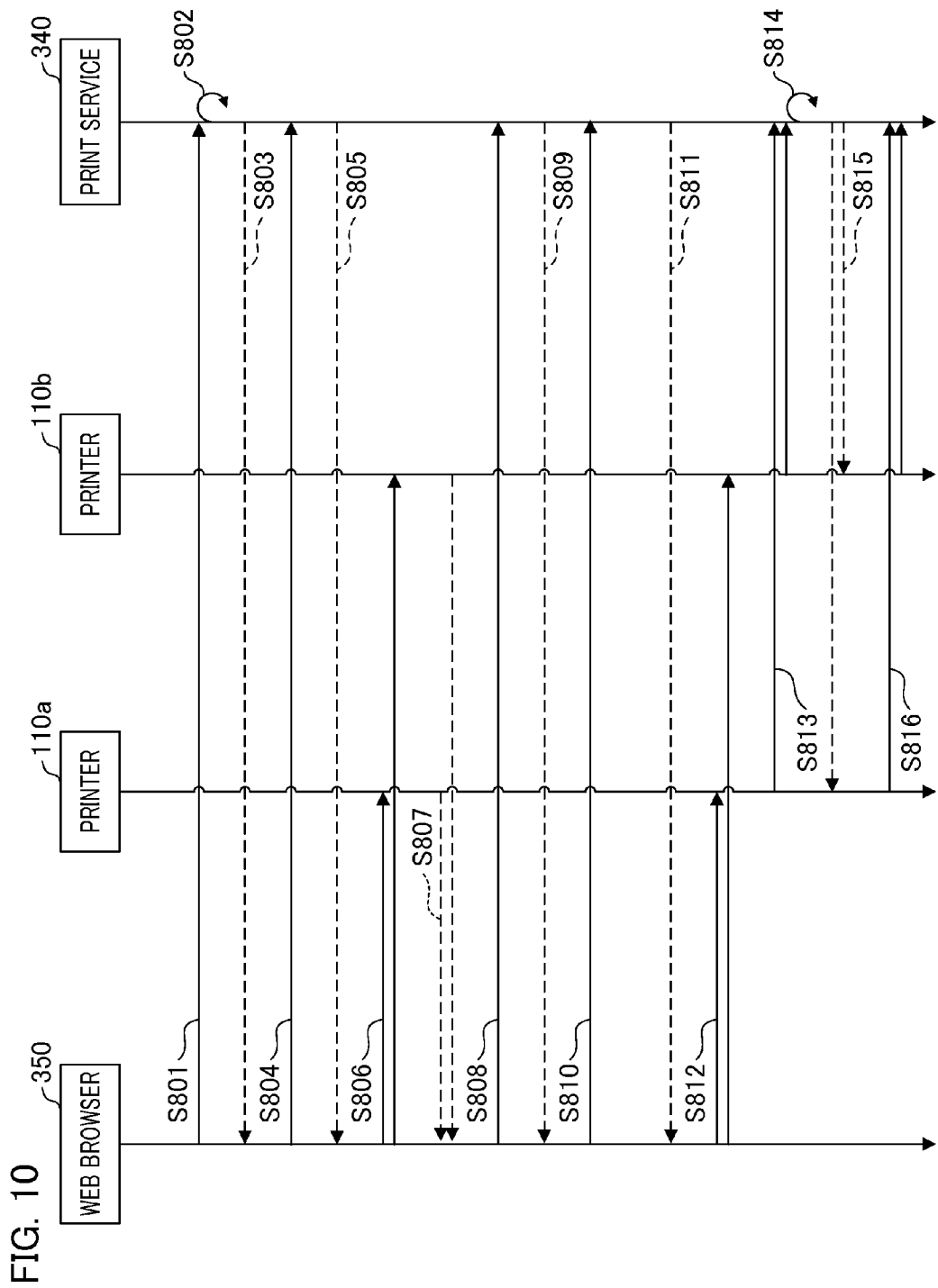
FIG. 10 illustrates processing for registering an image forming device in a print server in a second embodiment.

FIG. 10 is a sequence diagram describing exemplary registration processing of the image forming device group 110 in the print service 340 in the second embodiment. As shown in FIG. 10, the printers 110a and 110b are presented, and same operation is performed when only one printer 110a is present, or three or more image forming devices are present.

The series of processes in which printer registration processing is initiated and the Web browser 350 instructs the print service 340 to register the printer are the same as those in the first embodiment (S501 to S510), and thus, the descriptions thereof (S801 to S810) are omitted. When a user presses a printer registration executing button 405, the Web application 346 prepares each printer authentication ticket by the number of image forming devices to be registered in S811. Then the Web application 346 transmits, to the Web browser 350, a script for causing each printer 110a and 110b to access the access ticket acquiring URL by using each printer authentication ticket. The printer authentication ticket is preliminarily associated with user account information when the user logged in.

In S812, the Web browser 350 distributes the printer authentication ticket to the printers 110a and 110b according to the script received from the Web application 346, and instructs them to access the access ticket acquiring URL by using each printer authentication ticket.

In 813, the printer registration managing unit 312 of the printer 110a accesses the access ticket acquiring URL by using the printer authentication ticket received from the Web browser 350. In S814, the printer management unit 342 that has been accessed by the printer registration managing unit 312 associates user information with printer information, and stores them in the information storage unit 341. Upon completion of the storage, the control unit 343 instructs the printer management unit 342 to generate a service printer. The printer management unit 342 generates a service printer and associates it with user information and printer information shown in FIGS. 8A and 8B. In S815, the printer registration accepting unit 345 also transmits the access ticket to the printer 110a.

The printer 110a that has received the access ticket passes the access ticket to the print controlling unit 310 via the control unit 311. Thereinafter, the print controlling unit 310 accesses the print service 340 in accordance with information in the access ticket (S816). Processing in which the printer 110b accesses the access ticket acquiring URL to thereby acquire the access ticket is same as that performed by the printer 110a, and thus, a description thereof is omitted. Alternatively, the printer registration accepting unit 345 may issue the access ticket at the time both the printer 110a and the printer 110b have accessed the printer service 340. Alternatively, the printer registration accepting unit 345 may issue the access ticket at the time either the printer 110a or the printer 110b has accessed the printer service 340. When the aforementioned printer registration processing is completed, the Web application 346 transmits the printer registration completion screen shown in FIG. 6A to the Web browser 350, and processing ends. If there is an image forming device that failed to be registered for some reason, the Web application 346 may transmit a screen as shown in FIG. 6B. The aforementioned is printer registration processing in the second embodiment.

According to printer registration processing in the second embodiment, user can complete a registration of all image forming devices simply by instructing a printer registration on a UI provided by the print service 340.

Third Embodiment

In the first and second embodiments, a method for registering an image forming device on a UI provided by the printer service 340 by means of a known protocol search technique is described. However, there is a case in which another printer management services has already managed an image forming device. In such a case, the image forming device that is managed by that other print management service can be registered by acquiring printer information from the printer management service. In the third embodiment, a method is described in which the print service 340 acquires printer information from another printer management service, to thereby register the image forming device in the print service 340. Similar to the second embodiment, a content described in the first embodiment can be applied to content for which there is no specific description. Content described in the second embodiment can be also applied in the third embodiment. It should be note that content of a variation described in the first embodiment can be applied in the third embodiment. For example, as typical example, a device that registers printer information is not limited to the client 120. The present invention can be applied to a device having a display control unit corresponding to the Web browser 350 and this point also can be applied to the third embodiment.

Figure 11:
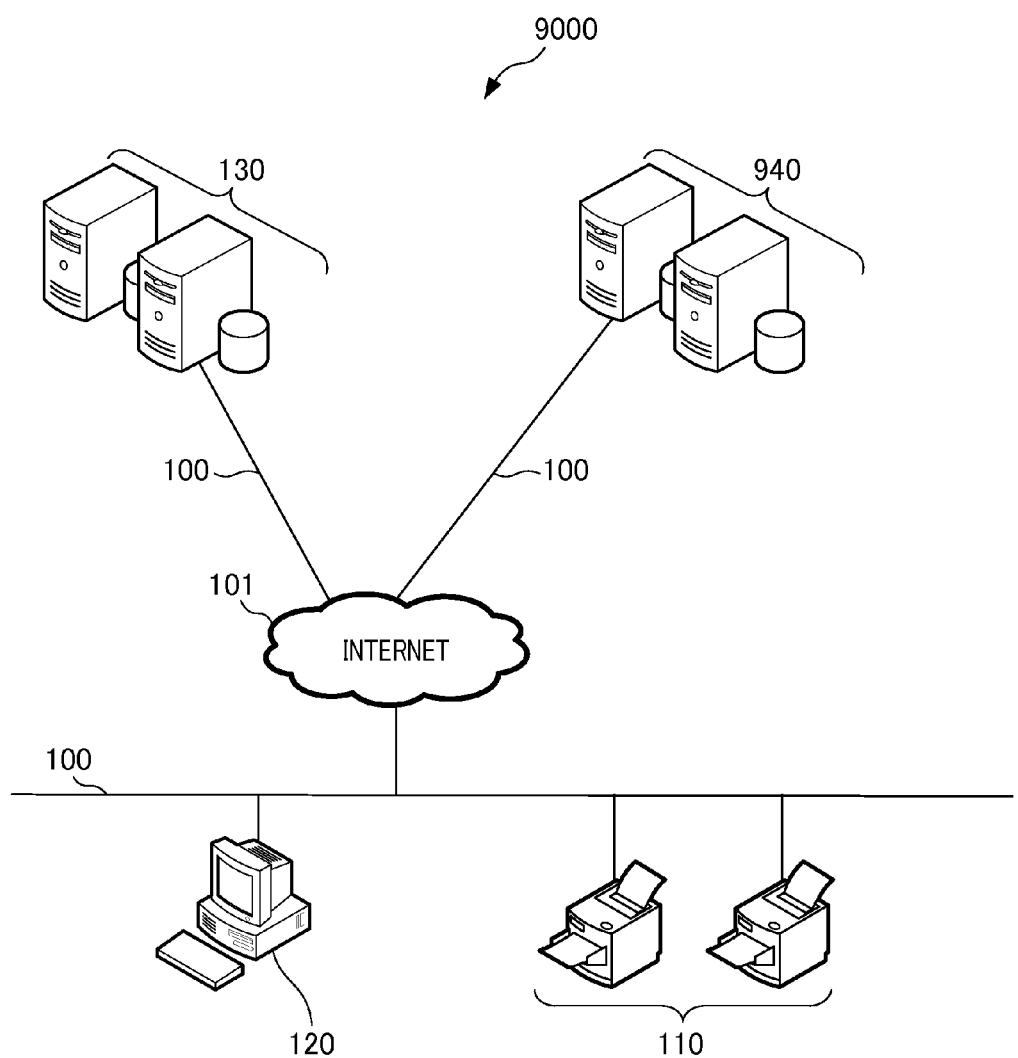
FIG. 11 illustrates an exemplary configuration of a printing system in third and fourth embodiments.

FIG. 11 is a diagram illustrating a configuration of a printing system 9000 of the third embodiment. The printing system 9000 includes a client 120, and one or more image forming device groups 110. The client 120 and the image forming device group 110 are devices located in a user environment and connected with each other via a network 100. The network 100 is connected to the Internet 101. Also, the printing system 9000 includes a print server group 130 and a printer management server group 940. Each device and server constituting the printing system 9000 is connectable and can perform data communication with each other via the Internet 101. The printer management server group 940 may be located in the user environment. In this case, the printer management server group 940, the client 120, and the image forming device group 110 may be connectable with each other via the network 100. Also, the image forming device group 110, the print server 130, and the print management server 940 are configured with a plurality of devices, but may be configured with only one device.

Figure 12:
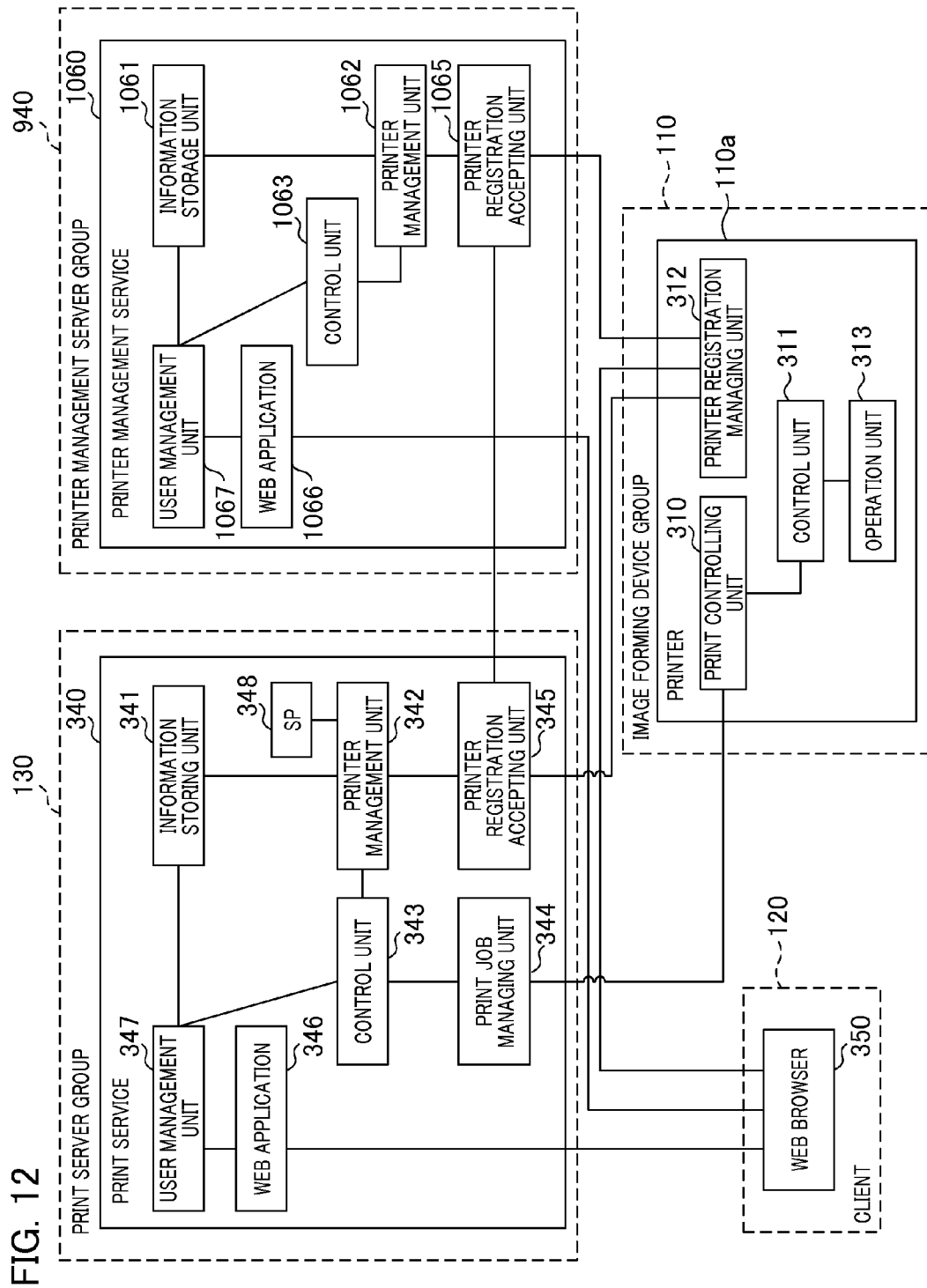
FIG. 12 illustrates a hardware configuration of devices and server groups constituting a printing system.

A hardware configuration of each device and server constituting the printing system 9000 is the same as that described in the first embodiment with reference to FIG. 2. FIG. 12 illustrates a software configuration of each device and server constituting the printing system 9000. Programs that realize the functions of each software configuration shown in FIG. 12 are stored in the ROM 203 of each device and server. The CPU 202 loads those programs onto the RAM 204 and executes them to realize these functions.

The print server group 130 is the same as that described in the first embodiment. The printer management server group 940 considers a plurality of servers as one server by virtualization, and the one virtual server realizes the functions of the printer management service 1060. Note that the printer management server 940 activates a further plurality of virtual machines in one virtual server, and causes each virtual machine to realize the function of the printer management service 1060. The printer management service 1060 shown in FIG. 11 represents one virtual machine among the virtual machines. Naturally, one server realizes the printer management service 1060.

The printer management service 1060 functions as a print service providing device that offers a print service. However, communication by the management service 1060 is not limited to the Internet, and any network such as a WAN may be available for communication. A configuration of the print service 340 is same as that described in the first embodiment, and thus, a description thereof is omitted. However, the printer registration accepting unit 345 can communicate with the printer registration accepting unit 1065 of the printer management service 1060 and transmit/receive printer information by connecting the network 100.

The printer management service 1060 includes an information storage unit 1061, a printer management unit 1062, a control unit 1063, a printer registration accepting unit 1065, a Web application 1066, and a user management unit 1067. The control unit 1063 controls the cooperation between each unit constituting the print service 340. The information storage unit 1061 is a database for storing registered image forming devices, user account information, and the like. The printer management unit 1062 manages the registered image forming devices or image forming devices of which the printer management service 1060 accepts a registration request.

The printer registration accepting unit 1065 accepts a registration request to register a printer in the printer management service 1060 from the printer 110a of the image forming device group 110, and instructs the printer management unit 1062 to manage the printer. The Web application 1066 accepts various requests from the Web browser 350 and provides a UI such as a login screen or a printer management screen of the printer management service 1060 with the Web browser 350. The user management unit 1067 manages user account information for using the printer management service 1060. Note that the printer management service 1060 may have a print job management unit (not shown). In this case, the printer management service 1060 may operate as a print service.

The client 120 includes a Web browser 350. The Web browser 350 communicates with the Web application 346 of the print server group 130, and acquires a login screen or a printer management screen of the print service 340 to thereby realize various operations. Similarly, the Web browser 350 communicates with the Web application 1066 of the printer management server group 940, and acquires a login screen or a printer management screen provided by the printer management service 1060 to thereby realize various operations. The Web browser 350 also communicates with the printer registration managing unit 312 of the image forming device group 110 so as to transmit a command related to a printer registration to the image forming device group 110.

The image forming device group 110 and the printer 110*a* are same as those described in the first embodiment, and thus, descriptions thereof are omitted. However, the printer registration accepting unit 345 can also communicate with the printer registration accepting unit 1065 of the printer management service 1060 by connecting to the network 100. The printer registration accepting unit 345 communicates with the printer registration accepting unit 1065 when the printer management server group 940 manages the image forming device.

Along with the first embodiment, printer information registered by the printer management unit 1062 of the printer management service 1060, and printer information and user account information shown in FIGS. 8A and 8B are stored in the information storage unit 1061. Also, an IP address of the image forming device is stored. In addition, information other than information shown in FIG. 8A such as information indicating whether or not an image forming device is a cloud-compatible printer may be stored.

FIG. 15 is a sequence diagram describing registration processing for registering the image forming device group 110 in the print service 340 in the third embodiment. Although only one printer 110*a* is represented in FIG. 15, the same processing is performed when a plurality of image forming devices such as the preprint 110*b* is present.

In the third embodiment, assume that user account information is stored in the print service 340 and the printer management service 1060, and a user account/password is issued and managed by the print service 340 and the printer management service 1060, respectively in advance. Also assume that printer information of the image forming device group 110 is registered in the printer management service 1060 in advance.

A user needs to log into the print service 340 for registering a printer from the Web browser 350 in the print service 340. The Web browser 350 displays a login screen (FIG. 16B) acquired from the print service 340, and uses a user password/password input by the user via the login screen to thereby log into the print service 340. Alternatively, information that is stored by the Web browser 350 may be used when the user has been previously logged in.

Figure 13A:
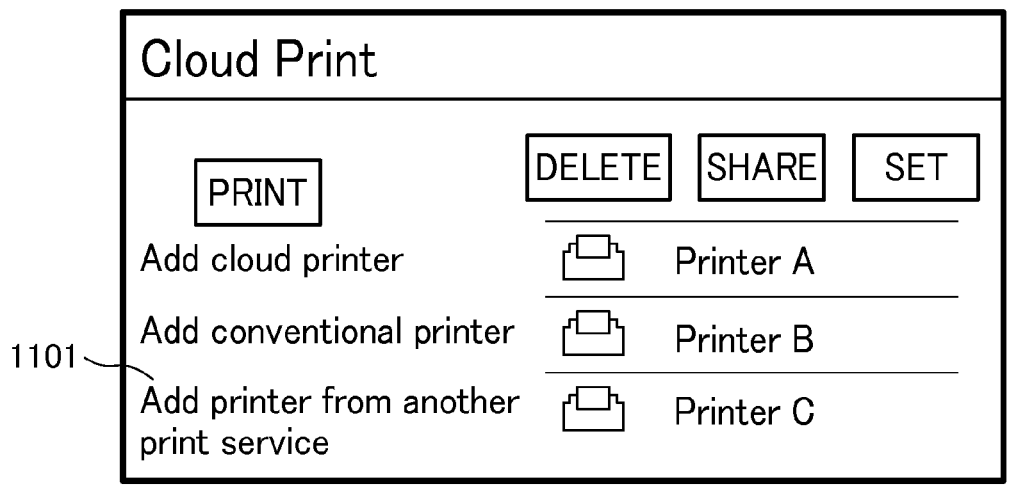
FIGS. 13A and 13B illustrate screen examples displayed on a UI of a user device.

When the print service 340 authenticates the user account/password input in S1201, and a login has been successfully made in S1202, the Web browser 350 displays a printer management screen (FIG. 13A) acquired from the print service 340 in S1203. When the user presses a link for registering the image forming device from another printer management service shown in reference numeral 1101 of FIG. 13A, the print service 340 redirects to the printer management service 1060 in S1205.

Specifically, a request for registering a printer that is registered in another print service is transmitted from the Web browser 350 to the print service 340 in response to pressing the link 1101 by the user in S1204. As a function of the request, the print service 340 redirects to the printer management service 1060 (S1205). Alternatively, an embodiment may be applied where the Web browser 350 receives a redirect instruction from the print service 340, and accesses the printer management service 1060 to thereby acquire a login screen for display discussed below.

The print service 340 transmits a redirect instruction for causing the printer management service 1060 to provide a login screen (S1206) when redirecting to the printer management service 1060 in S1205. Alternatively, the print service 340 may transmit a redirect instruction for causing the printer management service 1060 to provide a printer selection screen to the Web browser 350 (S1209) when the user logs into the printer management service 1060, the printer management service 1060 performs user authentication, and the user authentication is successfully made. Also, the print service 340 may contain, in the redirect instruction, an instruction for transmitting printer information of the printer that has been selected as a registration object on the printer selection screen to the print service 340. When only the printer management service 1060 is set as another print service, the print service 340 may not need to contain the instruction for providing the printer selection screen in the redirect instruction. In this case, an arrangement may be applied where the printer management service 1060 transmits printer information to the print service 340 upon receipt of the printer information from the Web browser 350 that selected the printer to be registered.

When there is a plurality of print services that varies by the vender that manages image forming devices, the print service 340 may execute the following processing in response to the request for registering the printer in S1204. The print service 340 provides a selection screen for selecting a printer service from among a plurality of print services that are provided by venders different from the vender that provides the printer management service 1060. When the user selects a print service on the selection screen and selection information is transmitted to the print service 340, the print service 340 redirects to the selected the print service.

Figure 13B:
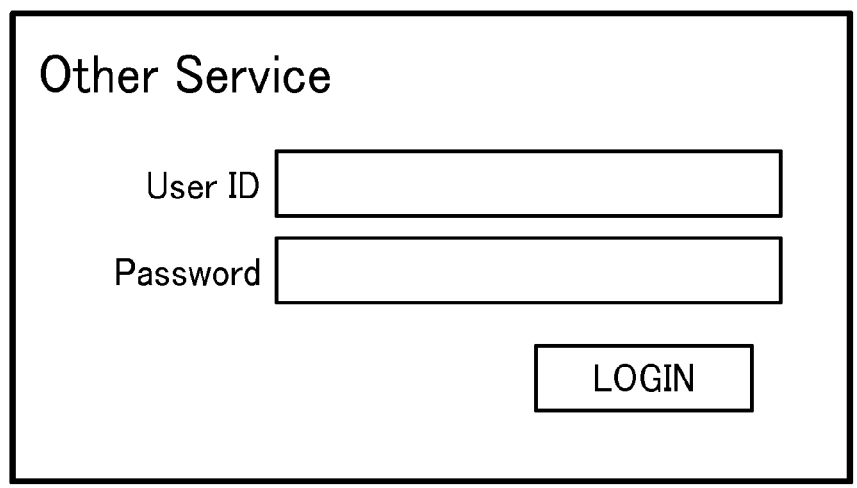

The user needs to log into the redirected printer management service 1060 in order to proceed with registration processing. Thus, in S1207, when the Web browser 350 displays a login screen shown in FIG. 13B, which is acquired from the printer management service 1060, and the user inputs a user account/password so as to log in. Alternatively, the user account/password that has been stored by the Web browser 350 may be automatically input when the user has been previously logged in.

Figure 14A:
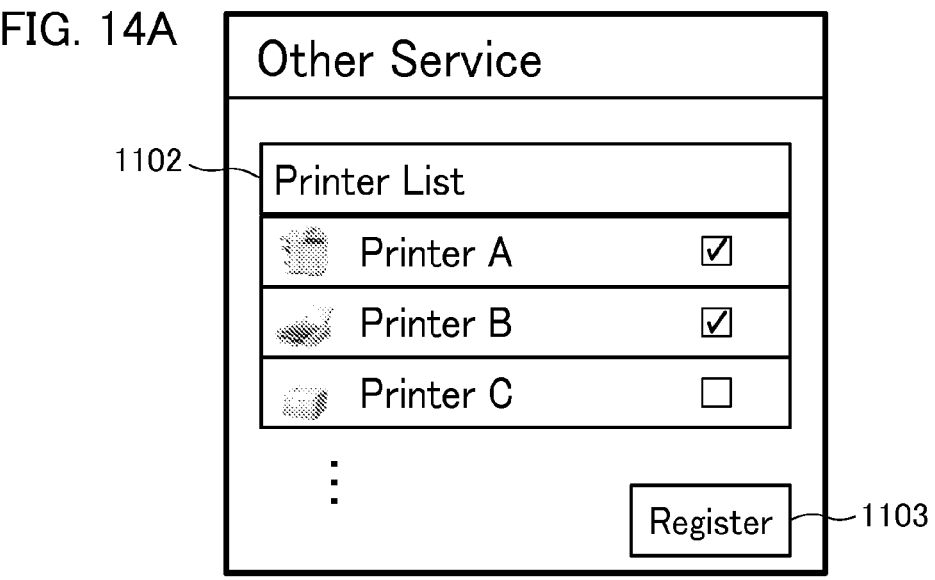
FIGS. 14A to 14C illustrate screen examples displayed on a UI of a user device.

In S1208, the Web application 1066 of the printer management service 1060 executes authentication processing by using the input user account/password in S1207. When the authentication has been successfully made, the Web application 1066 transmits a printer management screen shown in FIG. 14A to the Web browser 350 in S1209. The printer management screen (FIG. 14A) has a printer name list 1002 in which printers that have been registered in the printer management service 1060 are listed, and a printer registration executing button 1103. At this time, a selection screen including a check box for enabling a selection of an image forming device to be registered may be displayed as shown in FIG. 14A. Alternatively, when information indicating whether or not a printer to be registered is a cloud-compatible printer is registered in the printer management service 1060, the Web browser 350 may display only cloud-compatible printers in the printer name list 1002. In addition, when there is no cloud-compatible printer, the Web browser 350 may terminate printer registration processing at this point.

When the user presses the printer registration executing button 1103 in S1210, the Web browser 350 instructs the printer management service 1060 to register the selected printer. The Web application 1066 that has received the printer registration instruction instructs, via the control unit 1063, the printer registration accepting unit 1065 to transmit printer information of the image forming device selected by the user to the print service 340. In S 1211, the printer registration accepting unit 1065 that has received the instruction acquires printer information that is associated with user information from the information storage unit 1061, and transmits all printer information of the image forming devices to be registered to the printer registration accepting unit 345 of the print service 340. At this time, the printer registration accepting unit 1065 transmits the printer name, the PID, the IP address of the image forming device and the like as shown in FIG. 8A as printer information. Printer information also may include information indicating whether or not a printer to be registered is a cloud-compatible printer, capabilities and the like. Printer information of the image forming device that is not the cloud-compatible printer may be removed. Also, user information may be transmitted. With this arrangement, the print service 340 confirms the user information, resulting in a reduction of a possibility of the transmission of incorrect printer information. Although an embodiment is described where the printer management service 1060 directly transmits printer information to the print service 340, an embodiment is applied where the printer management service 1060 orders the Web browser 350 to make a request for the registration of printer information to the print service 340. In this case, the printer management service 1060 needs to transmit printer information to the Web browser 350.

Figure 14B:
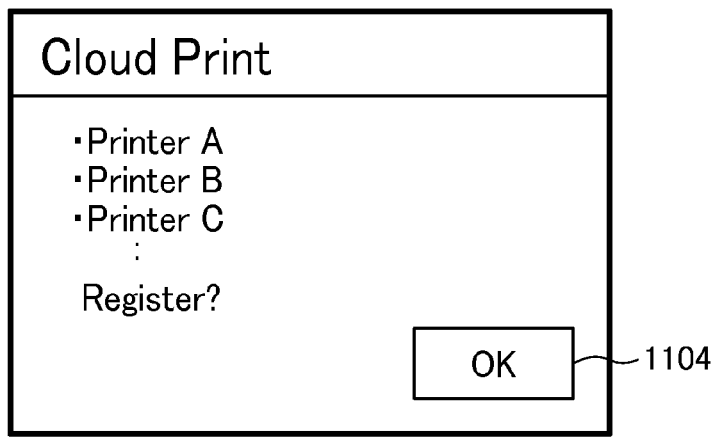

The printer registration accepting unit 345 of the print service 340 that has received printer information prepares printer authentication tickets by the number of image forming devices to be registered. The printer authentication ticket is associated with user information used by the user upon login to the print service 340 in advance. When information indicating whether or not a printer to be registered is a cloud-compatible printer is included in the printer information, the printer authentication ticket may be prepared only for the cloud-compatible printer. When there is no cloud-compatible printer, the printer registration processing may be terminated. The printer service 340 may display a screen for registration confirmation as shown in FIG. 14B before preparing the printer authentication ticket, and prepare the printer authentication ticket due to pressing a registration conformation button 1104 by the user.

In S1212, the printer registration accepting unit 345 transmits the printer authentication tickets to all of the image forming devices to be registered based on the printer information received from the printer management service 1060. At this time, the printer authentication ticket may be directly transmitted from the printer registration accepting unit 345 to the printer 110a, or transmitted from the Web application 346 to the printer 110a via the Web browser 350. Alternatively, the printer registration accepting unit 345 may prepare a URL for acquiring the printer authentication ticket, and may transmit the printer authentication ticket due to an access to the URL by the printer 110a. For causing the printer 110a to access the URL, the printer registration accepting unit 345 may directly instruct the printer 110a, or the Web application 346 may employ a script for causing the printer 110a to access the URL. The Web application 346 creates the script, and transmits it to the Web browser 350. The Web browser 350 that has received the script instructs the printer 110a to access the URL depending on the script.

Figure 14C:
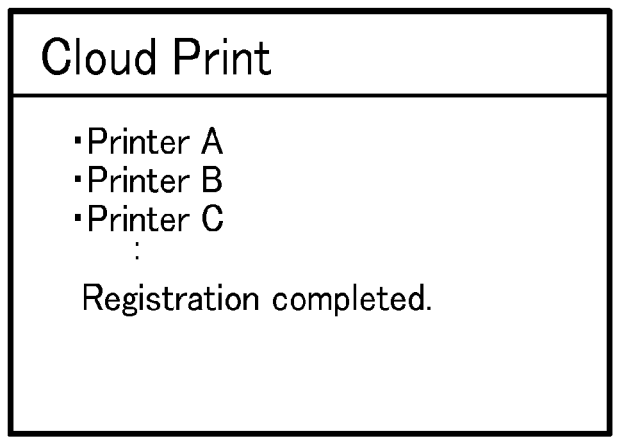

In S1213, the printer registration managing unit 312 of the printer 110a accesses the access ticket acquiring URL by using information in the received printer authentication ticket. Upon access from the printer 110a, the printer management unit 342 associates a user account that has been stored in advance with printer information and stores them in the information storage unit 341 in S1214. Upon completion of the storage, the control unit 343 instructs the printer management unit 342 to generate a service printer. The printer management unit 342 generates a service printer and associates it with the user information and printer information shown in FIGS. 8A and 8B. In S1215, the printer registration accepting unit 345 transmits the access ticket to the printer 110a. In S1216, the Web application 346 transmits a registration completion screen shown in FIG. 14C to the Web browser 350. When there is an image forming device that has failed to register, the Web application 346 may transmit a message indicating a failure (not shown).

The printer registration managing unit 312 passes the received access ticket to the print controlling unit 310 via the control unit 310. Thereinafter, the print controlling unit 310 accesses the print job managing unit 344 of the print service 340 in accordance with information in the access ticket (S1217). The aforementioned is printer registration processing in the third embodiment.

According to the printer registration processing in the third embodiment, the following effect can be provided. A user can register an image forming device that is managed by another print service that is different from the print service 340 in the print service 340 through an operation screen provided by the other preprint service due to an operation on a UI provided by the print service 340.

Fourth Embodiment

In the third embodiment, a description of the method is given in which the user initiates printer registration processing on a UI provided by the print service 340, the print service 340 acquires printer information from another printer management service 1060 so as to register an image forming device. In a forth embodiment, the user initiates printer registration processing on a UI provided by another printer management service 1060, the print service 340 acquires printer information from the another printer management service 1060 so as to register an image forming device. A system configuration, a hardware configuration and a software configuration for realizing the forth embodiment are same as those described in the third embodiment, and thus descriptions thereof are omitted. Contents in the first, second third embodiments, and modifications described in each embodiment can be applied to the fourth embodiment unless otherwise explained.

Figure 18:
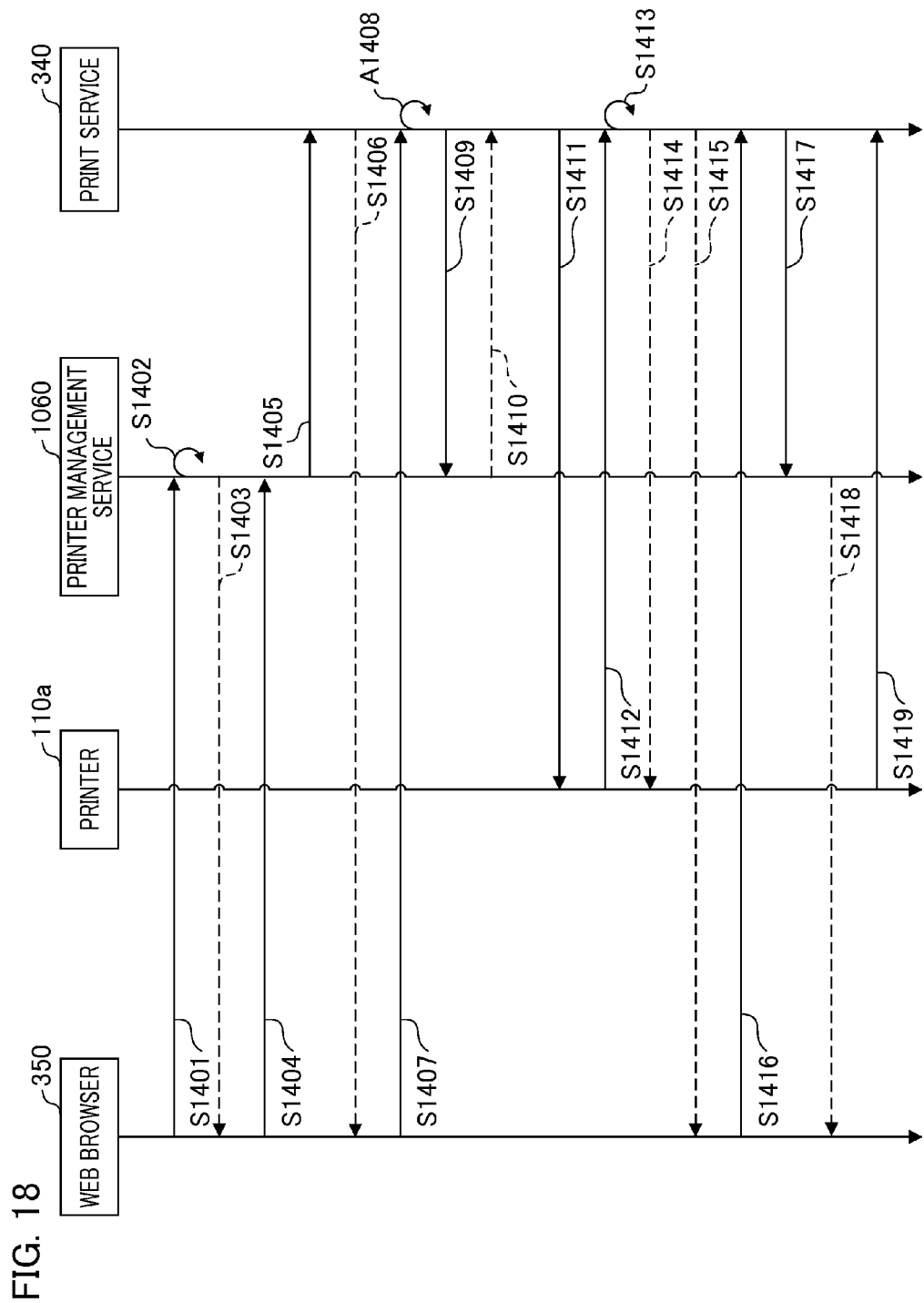
FIG. 18 illustrates processing for registering an image forming device in a print service.

FIG. 18 is a sequence diagram illustrating exemplary registration processing for registering the image forming device group 110 in the print service 340 in the fourth embodiment. Although only printer 110a is represented in FIG. 18, the same processing is performed when there is a plurality of image forming devices such as the printer 110b.

In the fourth embodiment, user account information is registered in the print service 340 and the printer management service 1060 in advance, and a user account/password is issued and managed by the print service 340 and the printer management service 1060, respectively. Also, printer information of the image forming device group 110 is registered in the printer management service 1060 in advance.

Firstly, a user needs to log into the printer management service 1060 in order to register a printer in the print service 340 via the Web browser 350. In S1401, the Web browser 350 displays a login screen acquired from the printer management service 1060, and logs into the printer management service 1060 in response to a user operation. The Web browser 350 transmits a user account/password input by the user to the printer management service 1060 upon login. Alternatively, information that is stored by the Web browser 350 may be used when the user has previously logged in.

The printer management service 1060 executes user authentication based on the user account/password input in S1401. When the user authentication has been successfully made in S1402, the Web application 1066 of the printer management service 1060 transmits a printer management screen shown in FIG. 16A to the Web browser 350 in S1403. The printer management screen (FIG. 16A) has the printer name list 1301 in which image forming devices that have been registered in the printer management service 1060 are listed, and a button 1302 for executing a printer registration with respect to the print service 340. At this time, the Web browser 350 may display a check box for selecting an image forming device to be registered. Alternatively, the Web browser 350 may display only cloud-compatible printers in the printer name list 1301 when information indicating whether or not the printer to be registered is a cloud-compatible printer is registered in the printer management service 1060. When there is no cloud-compatible printer, printer registration processing may be terminated at this point.

The fourth embodiment assumes that a printer registration with respect to the print service 340 is executed when the user presses the button 1302, but the embodiment is not limited thereto. Due to pressing of the button 1302 by the user, the Web application 1066 transmits a screen for a selection of a printer service that varies by the vender when the printer management service 1060 has information about the print service provided by another vender.

When the user presses button 1302 for executing the printer registration, the Web browser 350 instructs the printer registration accepting unit 1065 of the printer management service 1060 to register the selected printer in S1404. In S1405, the printer registration accepting unit 1065 that has received the printer registration instruction redirects to the printer registration accepting unit 345 of the print service 340. Specifically, the printer registration accepting unit 345 transmits, to the print service 340, a request for causing the print service 340 to transmit a login screen to the Web browser 350. An instruction for causing the print service 340 to request printer information to the printer management service 1060 after the Web browser 350 logs into the print services may be contained in the request. In this arrangement, the print service 340 can request the printer management service 1060 for printer information simply by logging into the print service 340 by the user. S1406, the Web application 1066 of the print service 340 that has received the redirect request transmits a login screen shown in FIG. 16B to the Web browser 350. Although an embodiment is described where the printer management service 1060 accesses the print service 340, an embodiment may be applied where the printer management service 1060 orders the Web browser 350 to accesses the print service 340 so that the Web browser 350 displays a login screen transmitted in S1406.

The user needs to log into the redirected print service 340 for proceeding registration processing. In S1407, the user inputs a user account/password on the login screen acquired from the print service 340 (FIG. 16B) so as to log in. Alternatively, information stored by the Web browser 350 may be used when the user has previously logged in.

When a login has been successfully made in S1408, the printer registration accepting unit 345 of the print service 340 requests printer information to be registered to the printer registration accepting unit 1065 of the printer management service 1060 in S1409. The printer registration accepting unit 1065 that has received the request for printer information of the image forming device to be registered acquires all printer information of the requested image forming devices from the information storage unit 1061. Then, in S1410, the printer registration accepting unit 1065 transmits the acquired printer information to the print service 340. At this time, printer information transmitted by the printer registration accepting unit 1065 has the printer name, the PID, the IP address of the image forming device, but may contain information indicating whether or not a printer to be registered is a cloud-compatible printer, capabilities and the like. Printer information of the image forming device that is not cloud-compatible printer may be excluded. Also, a user account may be transmitted.

The printer registration accepting unit 345 of the print service 340 that has received printer information prepares printer authentication tickets by the number of image forming devices to be registered. The printer authentication ticket is preliminarily associated with user account information used during login. When information indicating whether or not a printer to be registered is a cloud-compatible printer is included in printer information, the printer registration accepting unit 345 may prepare printer a authentication ticket only for a cloud-compatible printer. Also, when there is no cloud-compatible printer, the printer registration accepting unit 345 may the terminate printer registration processing at this point. A registration confirmation screen shown in FIG. 16C may be provided with the Web browser 350 via the Web application 346 before the printer registration accepting unit 345 prepare the printer authentication ticket, and printer registration accepting unit 345 may prepare the printer authentication ticket in response to pressing the registration confirmation button 1303 by the user.

In S1411, the printer registration accepting unit 345 transmits the printer authentication tickets to all of the image forming devices to be registered based on the received printer information from the printer management service 1060. At this time, the printer registration accepting unit 345 may directly transmit the printer authentication ticket to the printer 110a, or the Web application 345 may transmit the printer authentication ticket to the printer 110a via the Web browser 350. Otherwise, the print service 340 prepares a URL for acquiring the printer authentication ticket, and the printer registration accepting unit 345 passes the printer authentication ticket due to an access to the URL by the printer 110a. For causing the printer 110a to access the URL, the printer registration accepting unit 345 may directly instruct the printer 110a, or the Web application 346 may use a script for causing the printer 110a to access the URL. The Web application 346 creates the script and transmits it to the Web browser 350. The Web browser 350 that has received the script instructs the printer 110a to access the user in response to the script.

Figure 17A:
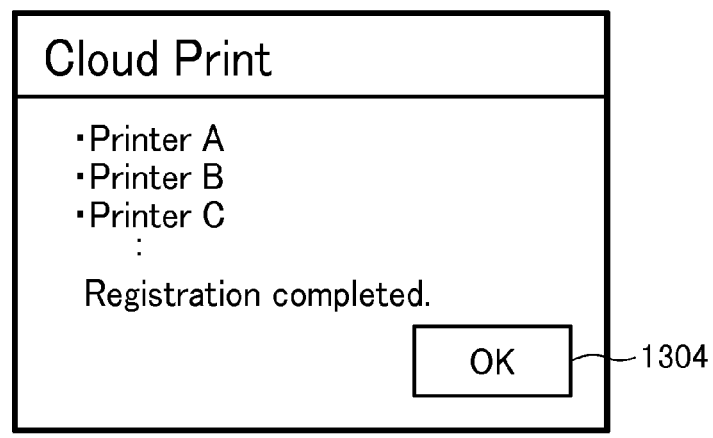
FIGS. 17A and 17B illustrate screen examples displayed on a UI of a user device.

In S1412, the printer registration managing unit 312 of the printer 110a accesses the access ticket acquiring URL by using information in the received printer authentication ticket. Upon access from the printer registration managing unit 31, the printer management unit 342 associates a user account that is stored in advance with printer information, and stores them in the information storage unit 341 in S1413. The control unit 343 instructs the printer management unit 342 to generate a service printer upon completion of the storage. The printer management unit 342 generates a service preprint and associates it with user information and printer information shown in FIGS. 8A and 8B. Subsequently, in S1414, the printer registration accepting unit 345 transmits the access ticket to the printer 110a. In S1415 the Web application 346 transmits a registration completion screen having a registration completion confirming button 1305 as a registration completion instructing unit as shown in FIG. 17A. If there is an image forming device that has failed to be registered, the Web application 346 may transmit a screen including a message indicating a failure (not shown).

Figure 17B:
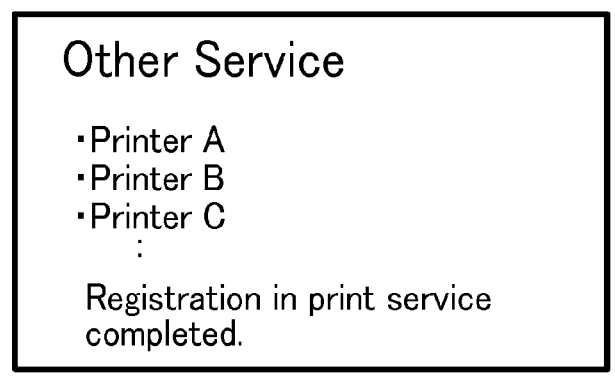

When the user presses a registration completion confirming button 1304 in S1416, the printer registration accepting unit 345 redirects to the printer management service 1060 via the control unit 343 of the print service 340 in S1417. Note that the printer registration accepting unit 345 may transmit a list in which the printer names that have been registered are listed at the same time. The printer registration accepting unit 1065 of the printer management service 1060 that has been redirected by the printer registration accepting unit 345 transmits a registration completion screen as shown in FIG. 17B through the Web application 1066 (S1418). The Web application 1066 may transmit a list in which the printer names that have been registered are listed to the Web browser 350 when the Web application 1066 has acquired the list from the print service 340, and the Web browser 350 may display it.

The printer registration managing unit 312 of the printer 110a passes the received access ticket to the print controlling unit 310 via the control unit 311. Thereinafter, the print controlling unit 310 accesses the print service 340 in accordance with information in the access ticket (S1419). The aforementioned is printer registration processing in the present embodiment.

According to printer registration processing in the fourth embodiment, the following effect can be obtained. A user can register an image forming device that is managed by another print service that differs from the print service 340 by means of an operation on a printer registration screen provided by the another the print service.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-126853 filed Jun. 4, 2012, which is hereby incorporated by reference herein in its entirety.

What is claimed is:

1. A service providing device that communicates with an image forming device that executes printing via a network, and provides a Web service to an information processing device, the service providing device comprising:
   a transmission unit configured to transmit a registration screen to the information processing device upon receipt of a registration request of the image forming device from the information processing device;
   a command unit configured to transmit a command for causing the information processing device to search the image forming device and respond to the service providing device with a search result upon receipt of an instruction from the information processing device via a registration instruction unit displayed on the registration screen; and
   a communication unit configured to register the image forming device in accordance with information included in the search result in response to the command, and to initiate communication with the registered image forming device,
   wherein the command unit transmits, to the information processing device, a command by the number of image forming devices for causing the image forming device to acquire authentication information that is used for acquiring access information in order for the service providing device to be utilized by the image forming device, and an authentication destination such that the information processing device requests authentication to the service providing device when the command unit accepts a registration instruction of the image forming device from the information processing device, and
   wherein a connection unit creates the access information in response to the authentication request, and sets the access information in a request destination of the authentication information.

2. The service providing device according to claim 1, wherein the transmission unit transmits a selection screen for selecting one or more image forming devices based on information included in the search result, and the communication unit registers all image forming devices selected on the selection screen.

3. The service providing device according to claim 1, wherein the command unit transmits, to the information processing device, a command for causing the information processing device to search all image forming devices that are registered in the information processing device and are capable of communicating with the service providing device, and acquire printer information of the searched image forming device, and upon receipt of the registration instruction of the image forming device selected on the selection screen, transmits, to the information processing device, a command for causing the one or more image forming devices to acquire the authentication information that is used for acquiring the access information in order for the service providing device to be utilized by the image forming device and for causing each the image forming device to acquire the access information.

4. A method for controlling a print system that includes an information processing device that utilizes a Web service, an image forming device that executes printing, and a service providing device that provides the Web service with the information processing device via a network, the method comprising:

transmitting, by the service providing device, a registration screen to the information processing device upon receipt of a registration request of the image forming device from the information processing device;

transmitting, by the service providing device, a command for causing the information processing device to search the image forming device and respond to the service providing device with a search result upon receipt of an instruction from the information processing device via a registration instruction unit displayed on the registration screen; and requesting, by the information processing device, printer information to the image forming device while searching the image forming device based on the command;

transmitting, by the image forming device, printer information to the information processing device in accordance with the request by the information processing device;

transmitting, by the service providing device, a selection screen for selecting the image forming device based on printer information;

receiving, by the information processing device, the selection screen from the service providing device for display;

transmitting, from the information processing device to the image forming device, authentication information that is used when the image forming device acquires access information for accessing the service providing device and an instruction for causing each the image forming devices to acquire the access information, wherein the authentication information and the instruction for acquisition of the access information are transmitted by the service providing device that has received a registration instruction by a user operation via the selection screen;

receiving, by the image forming device from the information processing device, the authentication information and the instruction for acquisition of the access information when the information processing device instructs the service providing device to register the image forming device, and requesting the service providing device for the access information by using the authentication information; and receiving, by the service providing device, the access information from the image forming device, registering the image forming device, and initiating communication with the registered image forming device.

5. A non-transitory storage medium on which is stored a computer program for making a computer execute a method for controlling a service providing device that communicates with an image forming device that executes printing via a network, and provides a Web service to an information processing device, the method comprising:

transmitting, by a transmission unit, a registration screen to the information processing device upon receipt of a registration request of the image forming device from the information processing device;

transmitting, by a command unit, a command for causing the information processing device to search the image forming device and respond to the service providing device with a search result upon receipt of an instruction from the information processing device via a registration instruction unit displayed on the registration screen; and registering, by a communication unit, the image forming device in accordance with information included in the search result in response to the command, and initiating communication with the registered image forming device, wherein the command unit transmits, to the information processing device, a command by the number of image forming devices for causing the image forming device to acquire authentication information that is used for acquiring access information in order for the service providing device to be utilized by the image forming device, and an authentication destination such that the information processing device requests authentication to the service providing device when the command unit accepts a registration instruction of the image forming device from the information processing device, and wherein a connection unit creates the access information in response to the authentication request, and sets the access information in a request destination of the authentication information.

* * * * *